(12) United States Patent
Boersma et al.

(10) Patent No.: US 6,273,500 B1
(45) Date of Patent: Aug. 14, 2001

(54) PANEL ASSEMBLY FOR AN OPEN ROOF CONSTRUCTION FOR A VEHICLE

(75) Inventors: Egbert Boersma, Helmond; Wilhelm Maria Theresia Hendricus Schrans, Nieuwegein, both of (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/366,374

(22) Filed: Aug. 3, 1999

(30) Foreign Application Priority Data

Aug. 5, 1998 (NL) .................................................. 1009807

(51) Int. Cl.[7] ....................................................... B60J 7/00
(52) U.S. Cl. ....................................... 296/216.09; 296/901
(58) Field of Search ................. 296/215, 216.06–216.09, 296/218, 901

(56) References Cited

U.S. PATENT DOCUMENTS

| | | | |
|---|---|---|---|
| 4,925,237 | * 5/1990 | Bohn et al. ........................ | 296/218 X |
| 5,073,012 | * 12/1991 | Lynam ................................. | 359/265 |
| 5,154,481 | * 10/1992 | Paetz et al. .................. | 296/216.08 X |
| 5,344,603 | 9/1994 | Jardin et al. ........................ | 264/261 |
| 5,507,547 | * 4/1996 | Hattass et al. ........................ | 296/211 |
| 5,992,928 | * 11/1999 | Kato et al. ........................ | 296/219.09 |
| 6,076,886 | * 6/2000 | Petri et al. ........................ | 296/216.09 |
| 6,079,771 | * 6/2000 | Brandner et al. ................ | 296/219.09 |

FOREIGN PATENT DOCUMENTS

| | | |
|---|---|---|
| 195 01 389 | 3/1996 | (DE) . |
| 0 771 684 | 5/1997 | (EP) . |
| WO-A-97/03855 | 2/1997 | (WO) . |

* cited by examiner

*Primary Examiner*—Dennis H. Pedder
(74) *Attorney, Agent, or Firm*—Westman, Champlin & Kelly, P.A.

(57) ABSTRACT

A panel assembly for an open roof construction for a vehicle having an opening in its fixed roof comprises a panel of plastic material, a stiffening frame extending along the circumference of the panel assembly and connecting means for connecting said panel and said stiffening frame to each other. The stiffening frame is positioned substantially externally of the plastic panel. The connecting means consist of an encapsulation formed at least externally around said panel, which consists of a non-transparent material which is softer than the panel material and whose upper side is substantially flush with the upper side of the panel.

11 Claims, 2 Drawing Sheets

PANEL ASSEMBLY FOR AN OPEN ROOF CONSTRUCTION FOR A VEHICLE

BACKGROUND OF THE INVENTION

1. Field of the Invention

The invention relates to a panel assembly for an open roof construction for a vehicle having an opening in its fixed roof, said panel assembly comprising a panel of plastic material, a stiffening frame extending along the circumference of the panel assembly and connecting means for connecting said panel and said stiffening frame to each other, said connecting means consisting of an encapsulation formed at least externally around said panel.

2. Description of the Related Art

A panel assembly of this kind is for example known from international patent application WO-A-97/003855. With the panel which is known therefrom, special arrangements have been made to accommodate the relatively great thermal expansion of the plastic material, in particular polycarbonate. A circumferential stiffening frame is provided under the panel, which stiffening frame supports a circumferential seal and which is connected to the panel via pin-slot connections, whereby pins formed on the underside of the panel by moulding are capable of movement in slotted holes in the frame extending in the direction of expansion. In this manner it is possible to accommodate the difference in the degree of expansion between the panel and the stiffening frame via movement of the pins of the panel in the slotted holes of the stiffening frame. The stiffening frame has an coefficient of expansion which at least approximately equals that of the vehicle roof, so that the circumferential seal is hardly influenced, if at all, by the temperature expansion.

A panel assembly according to the introduction is known from EP-A-0 771 684. This panel assembly includes a panel, a frame extending around the panel and an encapsulation between the panel and the frame. The frame has a horizontal portion extending partially below the panel and a vertical part to which the seal is attached. Between the vertical part of the frame and the panel is a weakened flexible portion of the encapsulation to absorb the deformation of the panel.

SUMMARY OF THE INVENTION

The object of the present invention is to further improve a panel assembly of the kind referred to in the introduction.

In order to accomplish that objective, the panel assembly according to the invention is characterized in that said stiffening frame is positioned substantially externally of the plastic panel, and in that the upper side of the encapsulation is preferably substantially flush with the upper side of the panel.

This panel assembly according to the invention has a number of advantages. In the first place, the encapsulation is formed around the panel, as a result of which the dimensions of the panel itself will be smaller with unchanged circumferential dimensions, as a result of which the absolute thermal expansion will decrease, too. According to the invention, the difference in thermal expansion between the plastic panel and the stiffening frame can be accommodated by the softer encapsulation, which takes up the expansion of the panel relative to the stiffening frame through deformation in the part between the inner side of the frame and the outer side of the panel. Preferably, the shape of the circumferential edge of the panel, the encapsulation and/or the stiffening will be so selected that said deformation will take place in downward direction, so that said deformation will not be visible from the outside of the vehicle.

Preferably, the stiffening frame is so embedded in said encapsulation that the stiffening frame partially overlaps the panel, seen in vertical direction.

In this way more headroom will be available, whilst the panel will be subjected to less flexural strain upon thermal expansion of the panel.

It is advantageous when the stiffening frame consists at least partially of a closed hollow section, preferably extending entirely circumferentially at some distance from the outer circumference of the panel.

The use of a hollow section for the stiffening frame will save encapsulation material, whilst a stiffening frame extending along the entire circumference will provide maximum strength and maximum resistance against deformation upon thermal expansion of the panel.

The invention will now be explained in more detail with reference to the drawing, which shows an embodiment of the invention.

DESCRIPTION OF THE PREFERRED EMBODIMENT

Figure 1:
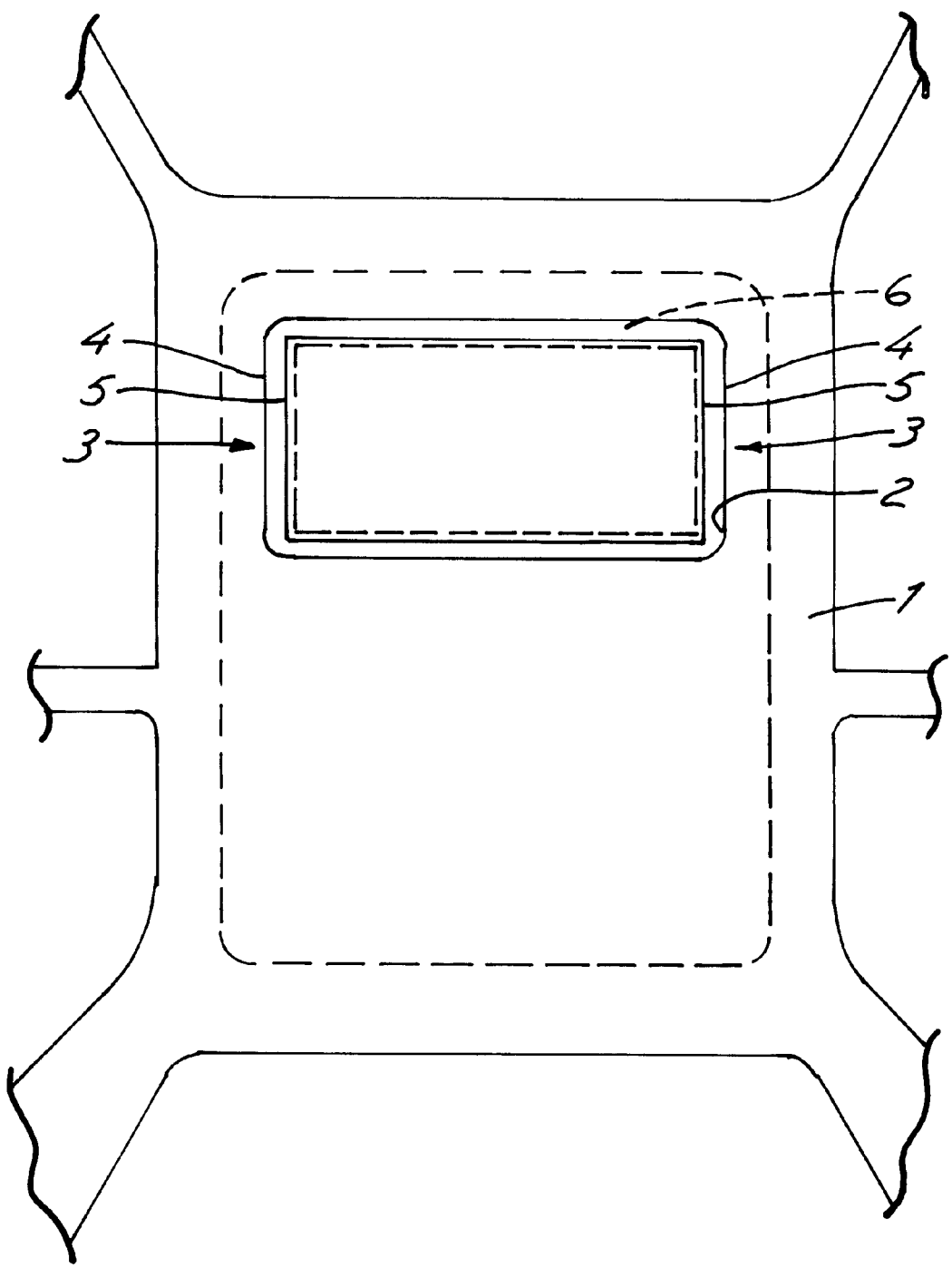
FIG. 1 is a plan view of a vehicle roof fitted with an open roof construction comprising an embodiment of the panel assembly according to the invention.

The drawing, and in the first instance FIG. 1, shows a fixed roof 1 of a vehicle, for example a passenger car, which is provided with a roof opening 2 for accommodating an open roof construction. The open roof construction comprises a panel assembly 3 for selectively closing or at least partially opening the roof opening 2. The open roof construction may be one of several possible types, for example a tilting roof, a tilting-sliding roof, a spoiler roof or a combination roof with various fixed and/or movable panel assemblies.

Figure 2:
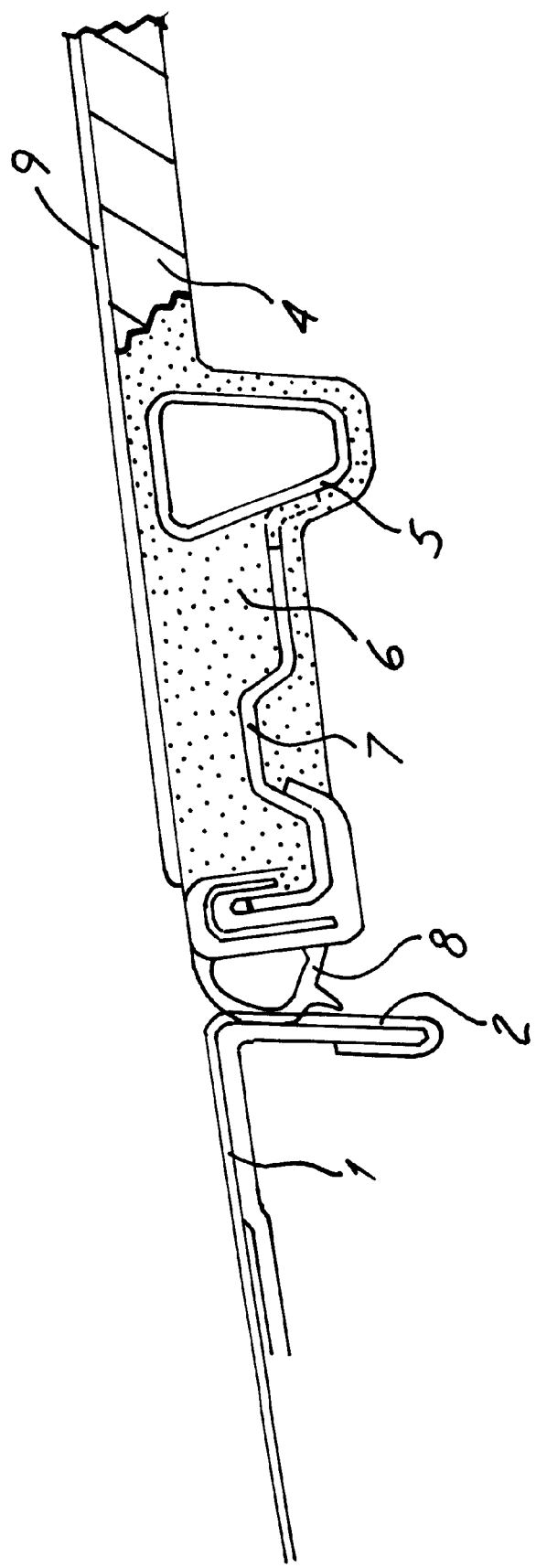
FIG. 2 is a larger-scale, sectional view along line II—II in FIG. 1.

FIG. 2 shows the construction of panel assembly 3 in more detail in a larger-scale sectional view. Panel assembly 3 comprises a panel 4, which occupies the larger part of the surface area of panel assembly 3, and which is preferably made of an at least partially transparent plastic material. Panel 4 may be formed from one piece of plastic material, or be built up of several layers, as will be explained in more detail yet. The preferred material for panel 4 is polycarbonate, but also other plastics may be used, of course. Panel 4 may have a limited thickness, for example in the order of 3 mm.

Panel assembly 3 further comprises a stiffening frame 5, an encapsulation 6, a mounting section 7 and a circumferential seal 8 mounted on said mounting section 7 for cooperation with fixed roof 1 of the vehicle so as to seal roof opening 2 completely in the closed position of panel assembly 3.

Stiffening frame 5 is provided for the purpose of strengthening and stiffening panel assembly 3, in most cases it is needed because panel 4 itself is not sufficiently strong. Stiffening frame 5 may consist of separate sections, but preferably it extends the entire circumference so as to possess sufficient strength and resistance against deformation. Stiffening frame 5 preferably consists of a closed hollow section, which is not filled with encapsulation material 6, which means a saving on said material. Additional parts may be locally formed or mounted on stiffening frame 5, such as parts of the operating mechanism on the sides of panel assembly 3.

Also the mounting section 7 for mounting seal 8 may be locally attached to stiffening frame 5, if desired, although this is not necessary if it is at least partially embedded and retained in encapsulation material 6.

Seal 8 may be mounted after the encapsulation material 6 has been applied, or prior to said encapsulation, in order to be connected thereto. Since said mounting section 7 is dimensionally stable, also upon thermal expansion of panel 4, there will be hardly any variation, if at all, between the outer circumference of panel assembly 3 and the circumference of roof opening 2. When the material of mounting section 7 and stiffening frame 5 is so selected that the coefficient of thermal expansion thereof is comparable with those of the fixed roof and the vehicle, the amount of variation in the sealing slot will be further reduced.

Encapsulation 6 is formed by means of an injection moulding process in a mould into which panel 4, stiffening frame 5 and mounting section 7, possibly together with seal 8, are placed, after which the encapsulation material is formed on or around said parts. The outer circumference of panel 4 preferably has an irregular, ribbed shape, which functions to provide a better bond between panel 4 and encapsulation 6. Encapsulation 6 consists of a material which is softer than the material of panel 4, so that any expansion of panel 4 due to temperature changes will be accommodated by the intermediate material of encapsulation 6. The shapes of the circumferential edge of panel 4, of encapsulation 6 and/or of stiffening frame 5 can thereby be so selected that the deformation of encapsulation 6 will mainly take place in downward direction. Encapsulation 6 may for example consist of a polyurethane or of a compound wherein PU is the main component, or of another type of plastic which is preferably sufficiently flexible. When the plastic of panel 4 exhibits a lower coefficient of thermal expansion than the encapsulation, said encapsulation may be made of a relatively harder material.

As already mentioned before, panel 4 may consist of a plate formed by means of an injection moulding process or by a rolling operation, or of a combination of several interbonded sheets, which may have been made by rolling, injection moulding or the like. It is conceivable that the upper side of the entire panel assembly 3 is provided with a coating 9 of for example a glossy material. This makes the panel assembly 3 look as if it is formed in one piece. The thickness of said coating may vary.

Encapsulation 6 is preferably made of a non-transparent material, but it is also possible to apply a lacquer or a coating to the outside of encapsulation 6. One possible technique to be used for this purpose is the application of said lacquer or said coating in the encapsulating mould at places where encapsulation 6 is to be formed. During said encapsulation process, said lacquer or said coating will bond to encapsulation 6 in that case. Of course it is also possible to apply said lacquer or said coating only locally. Generally, panel 4 is also provided with a lacquer or a coating in order to make it scratch-resistant. In many cases, panel 4 will be tinted to a greater or lesser degree, in principle it might be entirely non-transparent.

Due to the presence of encapsulation 6 round panel 4, said panel 4 may be significantly smaller than the outer circumference of panel assembly 3, as a result of which the absolute extent of the thermal expansion of panel 4 will be less than would be the case if panel 4 would extend as far as seal 8, whilst the smaller surface area of panel 4 facilitates the fabrication thereof by means of an injection moulding process. Encapsulation 6 takes over the function of the black ceramic edge in the case of glass panels, so that the underlying parts, such as the stiffening frame, the operating mechanism and the like are not exposed to view from outside in this case, either. Panel assembly 3 according to the invention is considerably lighter than a panel assembly comprising a panel which is made of glass.

The invention is not restricted to the above-described embodiment as shown in the drawing, which can be varied in several ways without departing from the scope of the invention. Thus, the seal may also be mounted on the underside of the panel assembly, or a seal may not be used altogether, for example if the seal is mounted on the stationary part of the open roof construction.

We claim:

1. A panel assembly for an open roof construction for a vehicle having an opening in its fixed roof, said panel assembly comprising:

a panel of plastic material;

a stiffening frame extending externally along the circumference of the panel assembly;

connecting means for connecting said panel and said stiffening frame to each other, said connecting means including an encapsulation formed at least externally around said panel, said encapsulation being formed of a non-transparent material which is softer than the panel material; and wherein said stiffening frame is positioned entirely externally of the circumference of said plastic panel, and wherein an upper side of the encapsulation is substantially flush with an upper side of said panel.

2. The panel assembly according to claim 1, wherein a seal is secured to a circumferential mounting section, which is mounted on said stiffening frame.

3. The panel assembly according to claim 1, wherein said stiffening frame consists at least partially of a closed hollow section, extending entirely circumferentially at some distance from the outer circumference of the panel.

4. The panel assembly according to claim 1, wherein a seal is provided along the circumference of the panel assembly.

5. The panel assembly according to claim 1, wherein a seal is secured to a circumferential mounting section, which is embedded in said encapsulation.

6. The panel assembly according to claim 1, wherein said panel has a thickness of about 3 mm.

7. The panel assembly according to claim 1, wherein the plastic material of the panel consists of polycarbonate and wherein said encapsulation is formed of a polyurethane.

8. The panel assembly according to claim 1, wherein said panel assembly is provided on the upper side with a glossy, transparent coating extending over said panel and said encapsulation.

9. A panel assembly for an open roof construction for a vehicle having an opening in its fixed roof, said panel assembly comprising:

a panel of plastic material;

a stiffening frame extending externally along the circumference of the panel assembly;

connecting means for connecting said panel and said stiffening frame to each other, said connecting means including an encapsulation formed at least externally around said panel;

said stiffening frame being positioned entirely externally of the circumference of the plastic panel; and wherein the encapsulation disposed between the inner side of the frame and the outer side of the panel is adapted to absorb deformations of the panel.

10. An open roof construction for a vehicle having an opening in its fixed roof, which open roof construction comprises:

a panel assembly for selectively closing or at least partially opening said roof opening, said panel assembly comprising:

a panel of plastic material;

a stiffening frame extending externally along the circumference of said panel assembly;

connecting means for connecting said panel and said stiffening frame to each other, said connecting means including an encapsulation formed at least externally around said panel;

wherein said stiffening frame is positioned entirely externally of the circumference of the plastic panel; and wherein the encapsulation disposed between the inner side of the frame and the outer side of the panel is adapted to absorb deformations of the panel.

11. The panel assembly according to claim 10, wherein said plastic panel and said stiffening frame are placed in a mold, while the mold is provided with a lacquer at places wherein the encapsulating material is injected, which lacquer will bond to said encapsulation following the injection thereof.

* * * * *